(12) United States Patent
Peebles et al.

(10) Patent No.: US 10,256,985 B2
(45) Date of Patent: Apr. 9, 2019

(54) SYSTEM AND METHOD FOR MANAGING AND SELECTING FROM MULTIPLE MOBILE DATA TOP-UP PRODUCT OPTIONS

(71) Applicant: Tata Communications (America) Inc., Herndon, VA (US)

(72) Inventors: Brian Peebles, Cranford, NJ (US); Frederic Dingemans, Montreal (CA); Patrick Menard, Town of Mount-Royal (CA)

(73) Assignee: Tata Communication (America) Inc., Herndon, VA (US)

(*) Notice: Subject to any disclaimer, the term of this patent is extended or adjusted under 35 U.S.C. 154(b) by 0 days.

(21) Appl. No.: 15/489,054

(22) Filed: Apr. 17, 2017

(65) Prior Publication Data

US 2017/0310495 A1 Oct. 26, 2017
US 2018/0316514 A2 Nov. 1, 2018

Related U.S. Application Data

(60) Provisional application No. 62/326,135, filed on Apr. 22, 2016.

(51) Int. Cl.
*H04L 12/14* (2006.01)
*H04M 15/00* (2006.01)
(Continued)

(52) U.S. Cl.
CPC ......... *H04L 12/1446* (2013.01); *G06Q 30/02* (2013.01); *H04L 12/14* (2013.01);
(Continued)

(58) Field of Classification Search
CPC .... G06Q 20/14; G06Q 20/145; G06Q 20/102; G06Q 20/28; G06Q 20/32; G06Q 20/085;
(Continued)

(56) References Cited

U.S. PATENT DOCUMENTS 7,136,932 B1 11/2006 Schneider
7,848,312 B2 12/2010 Zhang et al.
(Continued)

FOREIGN PATENT DOCUMENTS

CA 2970075 A1 6/2018
WO 2005057370 A2 6/2005

OTHER PUBLICATIONS

"Office Action in Canadian Counterpart Patent Application", Canadian Patent Application No. 2,964,924, dated Feb. 13, 2018, 5 pages.
(Continued)

*Primary Examiner* — Allahyar Kasraian
(74) *Attorney, Agent, or Firm* — Kaplan Breyer Schwarz, LLP

(57) ABSTRACT

A system and method for providing top-up of mobile data, by processing one or more transactions between a data sponsor and a data beneficiary who is possibly being served by multiple data providers. The top-up can be based on i) an application program interface (API) call being made into the mobile network operator of a data user or ii) an API call being made into a sponsored data (SD) platform/system (SDS) to allocate a quota to the data user, among other possible product options. In the first option, provisioning of the data quota and consumption against the quota is managed directly by the mobile network operator itself. In the second option, allocation of the quota and consumption against the quota is managed by the SDS and an SD control app. The system can select a particular option because that option best meets one or more business goals or rules.

21 Claims, 7 Drawing Sheets

(51) Int. Cl.
*H04W 4/60* (2018.01)
*G06Q 30/02* (2012.01)
*H04W 12/12* (2009.01)
*H04W 8/12* (2009.01)
*H04L 29/12* (2006.01)

(52) U.S. Cl.
CPC ........ *H04L 12/1435* (2013.01); *H04M 15/00* (2013.01); *H04W 4/60* (2018.02); *H04W 12/12* (2013.01); *H04L 61/605* (2013.01); *H04W 8/12* (2013.01)

(58) Field of Classification Search
CPC ........ G06Q 30/04; H04W 4/24; H04W 12/06; H04W 4/50; H04W 4/60; H04W 8/18; H04W 8/04; H04M 15/80; H04M 15/70; H04M 15/66; H04M 15/58; H04M 15/8083; H04M 15/61; H04M 15/725; H04M 15/8214; H04L 12/1407; H04L 12/14; H04L 12/1467; H04L 12/1446
USPC ..................... 455/405–409; 705/34
See application file for complete search history.

(56) References Cited

U.S. PATENT DOCUMENTS

| | | | |
|---|---|---|---|
| 8,693,358 | B2 | 4/2014 | Hodges |
| 8,755,769 | B2 | 6/2014 | Aaltonen et al. |
| 9,582,816 | B2 | 2/2017 | Peebles et al. |
| 2009/0286521 | A1 | 11/2009 | Buczek et al. |
| 2010/0191612 | A1 | 7/2010 | Raleigh |
| 2012/0089461 | A1 | 4/2012 | Greenspan |
| 2012/0155380 | A1 | 6/2012 | Hodges |
| 2013/0130643 | A1 | 5/2013 | Bacareza et al. |
| 2013/0132854 | A1* | 5/2013 | Raleigh ............ G06F 3/0482 715/738 |
| 2015/0172899 | A1 | 6/2015 | Sharma et al. |
| 2015/0242903 | A1* | 8/2015 | Peebles ............ G06Q 30/0267 705/14.64 |
| 2016/0142553 | A1* | 5/2016 | Gandhi ............ H04M 15/39 455/406 |

OTHER PUBLICATIONS

Authorized Officer: Lingfei Bai, "International Report on Patentability" issued in related PCT Application No. PCT/US2015/017102 dated Sep. 1, 2016.
Authorized Officer: Shane Thomas, "International Search Report and Written Opinion" issued in related PCT Application No. PCT/US15/17102, dated Jun. 19, 2015.
Formalities Officer: Koestel, Gilbert, "Intention to Grant" issued in EP application No. 15751405.0, dated Apr. 3, 2018.
"Extended European Search Report" issued in EP application No. 15751405.0, dated Mar. 3, 2017.
"Non-Final Office Action" issued in U.S. Appl. No. 14/628,443, dated Feb. 2, 2016.
"Final Office Action" issued in U.S. Appl. No. 14/628,443, dated Aug. 24, 2016.
"Notice of Allowance" issued in U.S. Appl. No. 14/628,443, dated Oct. 24, 2016.
"Office Action in Canadian Counterpart Patent Application", Canadian Patent Application No. 2,964,924, dated Nov. 2, 2018, 5 pages.

* cited by examiner

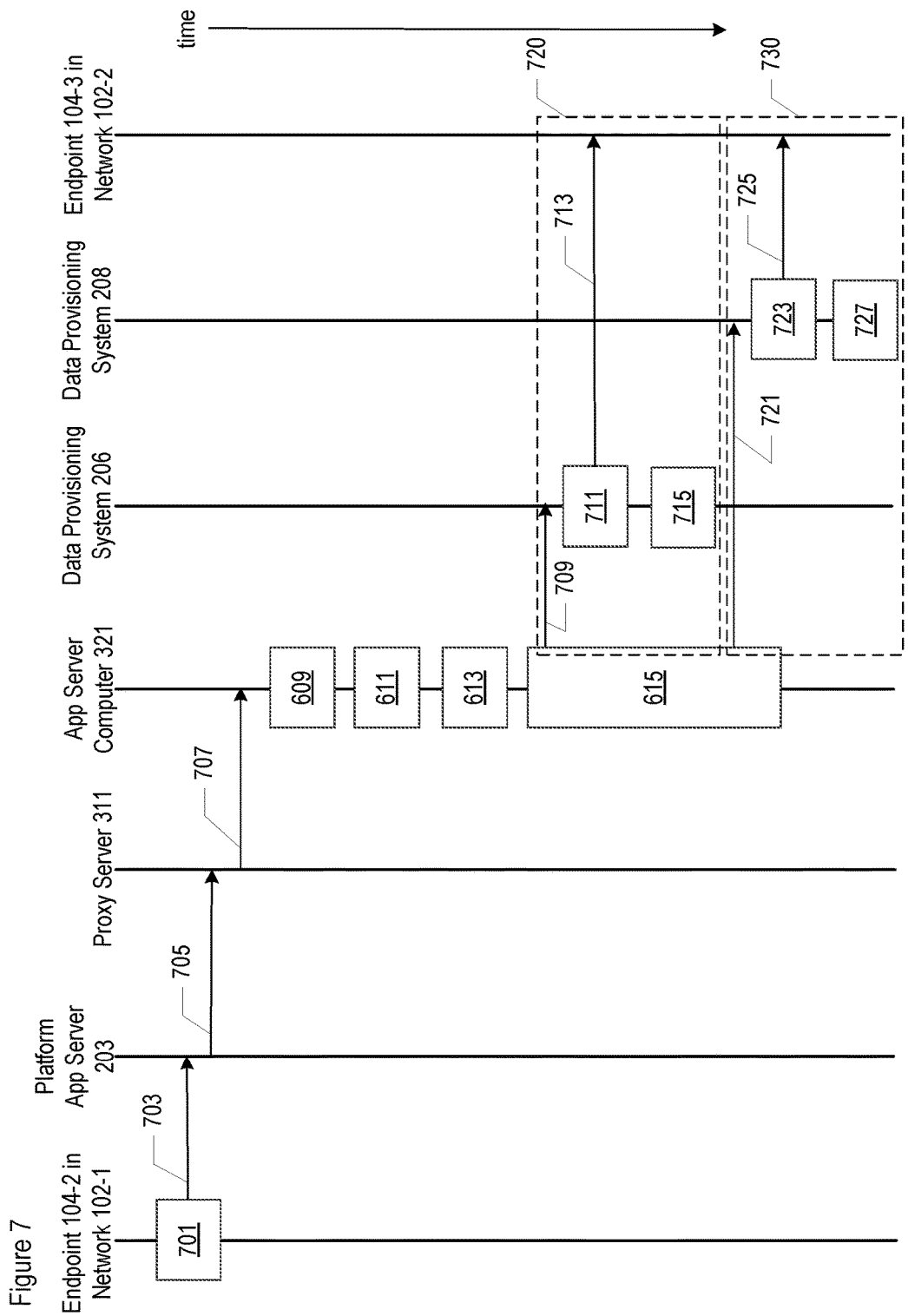

SYSTEM AND METHOD FOR MANAGING AND SELECTING FROM MULTIPLE MOBILE DATA TOP-UP PRODUCT OPTIONS

CROSS REFERENCE TO RELATED APPLICATIONS

This application is related to the following documents that are incorporated by reference herein:
(1) U.S. Patent Application No. 62/326,135, filed on Apr. 22, 2016; and
(2) U.S. patent application Ser. No. 14/628,443, now U.S. Pat. No. 9,582,816, filed on Feb. 23, 2015.

If there are any contradictions or inconsistencies in language between this application and the documents that have been incorporated by reference that might affect the interpretation of the claims in this application, the claims in this application should be interpreted to be consistent with the language in this application.

FIELD OF THE INVENTION

The present invention relates to telecommunications in general, and, more particularly, to accessing data via a mobile network or other network capable of exchanging and/or providing data.

BACKGROUND OF THE INVENTION

Data access in a mobile network is unique in the world in that the operator charges the subscriber per access and by quantity. To that end, a mobile network operator (MNO) keeps a detailed subscriber record in its database. Subscriber records are used to control a mobile subscriber's ability to access the mobile network and the capabilities available to the user when using the mobile network. For example, subscriber account information can be used to determine if the subscriber can access the mobile network and at what usage level.

In the current mobile model, all data received and sent by a mobile device user is tracked by the MNO and charged against a pre-agreed data plan. This could be a post-paid plan, as is most common in the United States, or a prepaid type plan where mobile users pay up front for a block of data. Once the mobile data allowance or "quota" is used, the mobile user has to pay for the extra amount on their monthly bill or "top up" their phone in the prepaid model if they want to continue using data services.

There are two types of transactions that result in a data quota being added to the data allowance of a mobile device or other connected device. The first type of transaction involves a purchase, in which a data sponsor purchases an amount of mobile data (i.e., the quota), which is made available to the subscriber of the mobile device. The data sponsor can be a natural person or a juridical entity (e.g., a business, a brand, etc.). The second type of transaction involves a transfer, in which the data sponsor transfers an amount of mobile data, debiting the sponsor's own quota and making it available for consumption or for further transaction to the recipient subscriber of the mobile device.

Specific examples of the aforementioned types of transactions include, without limitation: peer-to-peer mobile data gifting (e.g., gifting from a sponsor, etc.), a merchant or brand providing mobile data to a peer as currency for a reward, a connected device being reloaded through top-up, and a service pass.

SUMMARY OF THE DISCLOSURE

The present invention enables the ability to provide top-up of mobile data, by processing one or more transactions between a data sponsor and a data beneficiary who is possibly being served by multiple data providers. In accordance with the illustrative embodiment of the present disclosure, top-up can be based on i) an application program interface (API) call being made into the mobile network operator (MNO) of a data user or ii) an API call being made into a sponsored data (SD) platform/system (SDS) to allocate a quota to the data user, among other possible options. In the first option, provisioning of the data quota and consumption against the quota is managed directly by the mobile network operator itself. In the second option, allocation of the quota and consumption against the quota is managed by the SDS and an SD control app, while a mobile network operator delivers the data to the data user. In at least some embodiments of the present invention, the sponsor and data user, or subscriber, can be one and the same; the subscriber can buy data for himself or herself.

The system of the illustrative disclosure generates a set of one or more optimal products for a beneficiary recipient subscriber. In the event that more than one product option is available for allocating the data quota to the recipient subscriber, the system of the illustrative disclosure selects a particular option because that option best meets one or more business goals or rules, as tracked by a routing engine disclosed herein, while considering one or more product information items, as tracked by products engine disclosed herein.

The disclosed system and method provide a technical improvement, in that a variety of data top-up transactions can be accommodated on the inbound side (i.e., data sponsor side), such as a purchase transaction and a transfer transaction, while aggregating additional data provisioning systems, such as sponsored-data systems and direct network provisioning systems on the outbound side (i.e., data recipient side), and while considering one or more business rules in deciding on the outbound data provisioning system to utilize.

An illustrative system for providing mobile data comprises: a database configured to onboard one or more mobile networks to supply data to mobile subscribers at one or more telecommunication endpoints; a processor configured to: a) validate an indication of a mobile subscriber as being recognized by an on-boarded mobile network, and b) generate a set of one or more optimal data products, including i) a first product provided by a first vendor comprising the on-boarded mobile network that recognizes the indication of the mobile subscriber and ii) a second product provided by a second vendor comprising a zero-rating system, wherein the zero-rating system is external to the on-boarded mobile network; and a network interface configured to: a) receive i) the indication of the mobile subscriber and ii) an indication of a data amount, and b) transmit a data top-up request to a selected vendor, wherein the data top-up request comprises i) the indication of the mobile subscriber and ii) the indication of the data amount, and wherein the selected vendor to which the data top-up request is transmitted is based on at least one business rule.

An illustrative method for providing mobile data comprises: onboarding, by a computer system, one or more mobile networks to supply data to mobile subscribers at one or more telecommunication endpoints; receiving, by the computer system, i) an indication of a mobile subscriber and ii) an indication of a data amount; validating, by the computer system, the indication of the mobile subscriber as being recognized by an on-boarded mobile network; generating, by the computer system, a set of one or more optimal data products, including i) a first product provided by a first vendor comprising the on-boarded mobile network that recognizes the indication of the mobile subscriber and ii) a second product provided by a second vendor comprising a zero-rating system, wherein the zero-rating system is external to the on-boarded mobile network; and transmitting, by the computer system, a data top-up request to a selected vendor, wherein the data top-up request comprises i) the indication of the mobile subscriber and ii) the indication of the data amount, and wherein the selected vendor to which the data top-up request is transmitted is based on at least one business rule.

BRIEF DESCRIPTION OF THE DRAWINGS

FIG. 7 illustrates an example of endpoint 104-2, which is being served by a first MNO and in CSP network 102-1, providing a data quota to endpoint 104-3, which is being served by a second MNO and in CSP network 102-2.

DETAILED DESCRIPTION

"App"—For the purposes of this specification, the phrase "app" is defined as an application downloaded to and executed by a wireless terminal or other mobile device.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Processor—For the purposes of this specification, a "processor" is defined as hardware or hardware and software that perform mathematical and/or logical operations. A processor can be one or more computational elements, whether co-located or not and whether networked together or not.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

"Sponsor"—For the purposes of this specification, the phrase "sponsor" is defined as an entity associated with sponsored data, which can be, without limitation, an enterprise, an enterprise offering split billing to its employees, a third party, such as an advertiser, an Ad network, or a collection of destinations. Typically, a sponsor is any entity that pays for at least some of the cost of sponsored data. Yet, the sponsor might not offer any content at all. In some scenarios, the sponsor and beneficiary can be the same (i.e., "self-sponsorship").

"Sponsored data"—For the purposes of this specification, the phrase "sponsored data" is defined as data usage by a mobile subscriber that is not charged to the subscriber's mobile data plan.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Figure 1:
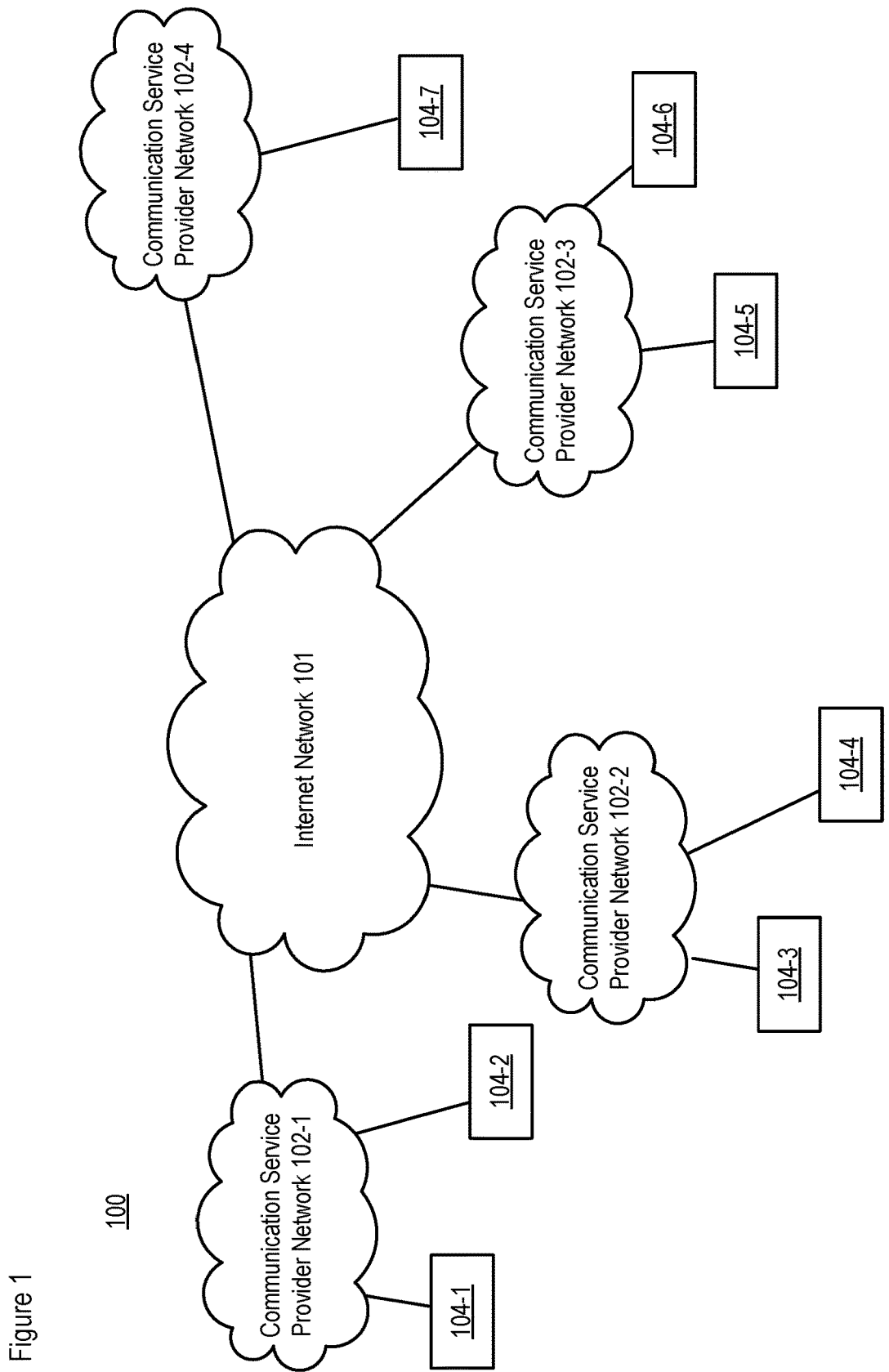
FIG. 1 depicts telecommunications system 100, in accordance with the illustrative embodiment of the present invention.

FIG. 1 depicts telecommunications system 100, in accordance with the illustrative embodiment of the present invention. Telecommunications system 100 comprises Internet network 101, communication service provider networks 102-1 through 102-4, and telecommunication endpoints 104-1 through 104-7, interrelated as shown.

Internet network 101 is a network that transports information electronically. It comprises at least a portion of the Internet, the global system of interconnected computer networks that use the Internet protocol suite (TCP/IP) to link billions of user devices and networking devices worldwide. Internet network 101 comprises a plurality of Internet service provider (ISP) networks of various forms. An ISP is an organization that provides services for accessing, using, and/or participating in the Internet. It provides services for accessing, using, and/or participating in the Internet, through its communications network. Some of the more specific classifications of an ISP network is "local", "tier 2", and "tier 1". Internet service providers whose networks constitute Internet network 101, as well as other elements within telecommunications system 100, establish the worldwide connectivity between individual networks at various levels of scope.

Internet network 101 comprises computer- and/or telecommunications-networking devices, which can include gateways, routers, network bridges, switches, hubs, and repeaters. The networking devices that constitute network 101 can also include hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points, networking cables, and other related hardware. At least some of the networking devices that are present in Internet network 101, as well as elsewhere within telecommunications system 100, use routing tables in their operating system to direct IP packets to the next-hop router or destination. Routing tables are maintained by manual configuration or automatically by routing protocols.

Communication service provider (CSP) network 102-$i$, wherein i as depicted has a value of between 1 and 4, inclusive, is a network that transports information electronically. In accordance with the illustrative embodiment, CSP network 102-$i$ is that of a telecommunications service provider (TSP). A TSP can be an incumbent local exchange carrier, a competitive local exchange carrier, and/or a mobile wireless communication company operated by a mobile network operator (MNO), for example and without limitation. In some embodiments of the present invention, CSP network 102-$i$ can include or alternatively be the network of an Internet provider, a cable provider, a satellite provider, or a managed services business provider, for example and without limitation.

Communication service provider (CSP) network 102-$i$ provides user devices of its end users—for example, endpoints 104-1 through 104-7—with access to Internet network 101. Communication service provider (CSP) network 102-$i$ can also provide each endpoint with connectivity to one or more other endpoints, either through Internet network 101 or not. In some operating environments, CSP network 102-$i$ provides such access to a local area network (LAN), which in turn provides access to the end user. As depicted, the communication provider networks are outside of Internet network 101. In some other embodiments, however, one or more of the communication service provider networks can be considered as part of Internet network 101 (e.g., some local Internet service provider networks, etc.).

Each CSP network 102-$i$ comprises computer- and/or telecommunications-networking devices, which can include gateways, routers, network bridges, switches, hubs, and repeaters. The networking devices that constitute network 102-$i$ can also include hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points, networking cables, and other related hardware.

Furthermore, each CSP network provides endpoints with access via one or more access networks. An "access network" is the part of a telecommunications network that connects endpoints to their immediate service provider network, in this case CSP network 102-$i$. The access networks conform to one or more telecommunications standards. Some examples of such telecommunications standards include, without limitation: Global System for Mobile Communications (GSM), Universal Mobile Telecommunications System (UMTS), 4G Long Term Evolution (LTE), CDMA-2000, IS-136 TDMA, IS-95 CDMA, 3G Wideband CDMA, IEEE 802.11 Wi-Fi, IEEE 802.16 WiMax, Bluetooth, LoRa, and so on. In at least some operating environments, the access network directly used by such endpoints is privately owned or maintained (e.g., a home LAN, a business enterprise, etc.), and is connected to the CSP network via a networking device (e.g., a router, etc.) associated with the private network.

Although four communication service provider networks are depicted in FIG. 1, a different number of such networks can be present, as those who are skilled in the art will appreciate after reading this specification.

Telecommunication endpoint 104-$k$, wherein k as depicted has a value of between 1 and 7, inclusive, is a connected device that enables its user (e.g., human, machine, etc.) to telecommunicate with resources within Internet network 101, with other endpoints, and/or with other resources within telecommunications system 100. Endpoint 104-$k$ is capable of telecommunications with or without a wire or tangible medium, such that some endpoints are wired, some endpoints are wireless, and some are both, in any combination. An endpoint can be mobile or immobile, and an endpoint can transmit or receive, or transmit and receive. An endpoint can be a wireless terminal, a cellular telephone or cellphone, a wireless transmit/receive unit (WTRU), a user equipment (UE), a mobile station, a fixed or mobile subscriber unit, a pager, a personal digital assistant (PDA), a smartphone, a tablet, a phablet, a smart watch, a desk set, a computer, or any other type of end-user device capable of operating in a telecommunications environment, for example and without limitation. In some embodiments of the present invention, one or more endpoints can be a connected device within a machine-to-machine (M2M), Internet of Things (IoT), or automotive (e.g., self-driving car, etc.) context.

Endpoint 104-$k$ is capable of providing access to its user via one or more access networks, as described above and in regard to CSP network 102-$i$. As already described, some examples of access networks include networks based on the following telecommunications standards, without limitation: Global System for Mobile Communications (GSM), Universal Mobile Telecommunications System (UMTS), Long Term Evolution (LTE), CDMA-2000, IS-136 TDMA, IS-95 CDMA, 3G Wideband CDMA, IEEE 802.11 Wi-Fi, IEEE 802.16 WiMax, Bluetooth, LoRa, and so on.

Although seven telecommunication endpoints are depicted in FIG. 1, a different number of such endpoints can be present, as those who are skilled in the art will appreciate after reading this specification. Furthermore, a different number than depicted can be associated with each communication service provider network 102-$i$. One or more endpoints can be associated with a given end user.

Figure 2:
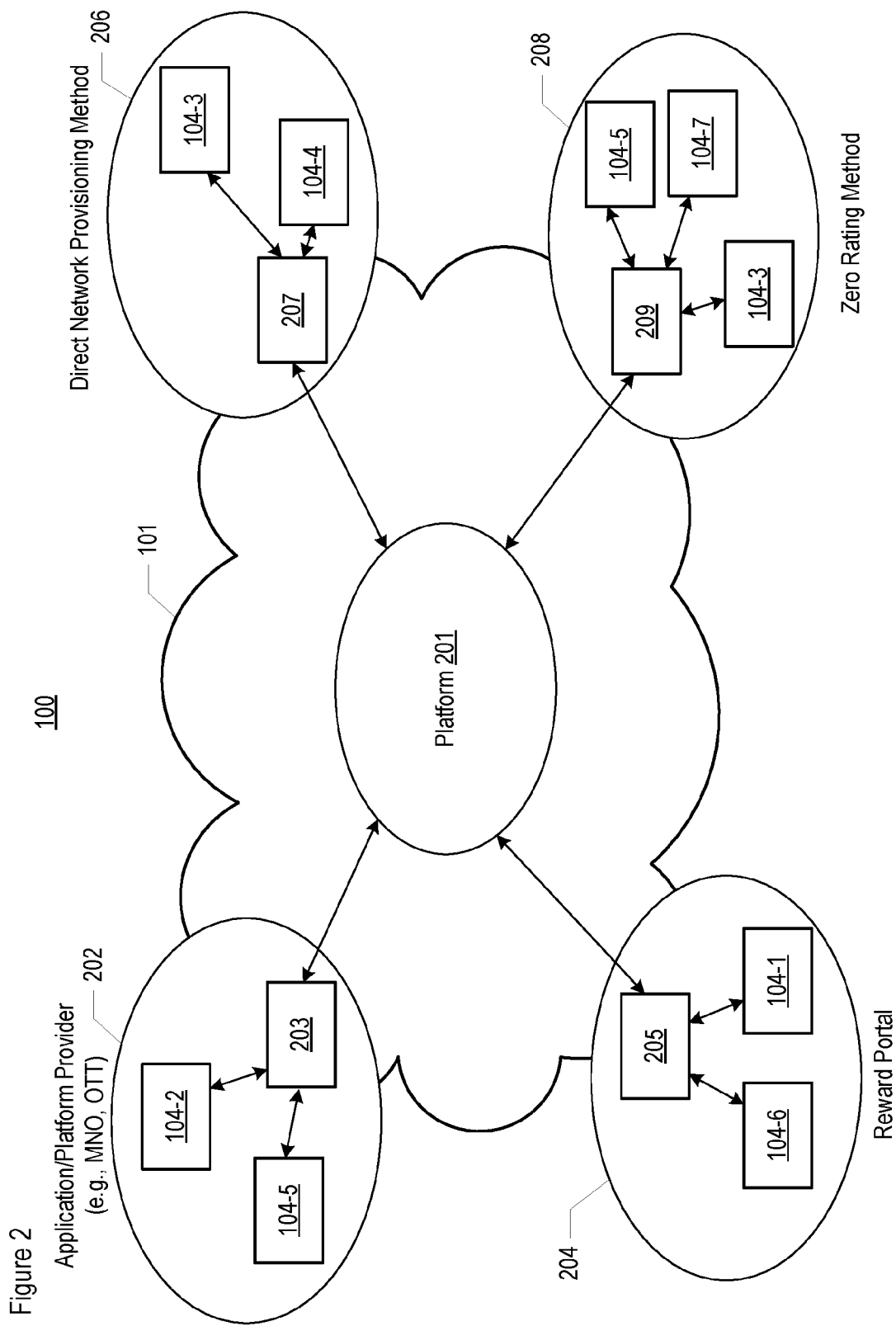
FIG. 2 depicts an alternative view of telecommunications system 100.

FIG. 2 depicts an alternative view of telecommunications system 100, which includes an illustrative combination of i) mobile money platform (MMP) 201; ii) data sponsors, including application/platform provider system 202 and reward portal 204; and iii) data recipients, including direct network provisioning system 206 and zero rating system 208. As those who are skilled in the art will appreciate, after reading this specification, other types of data sponsor systems and other types of data recipient systems (e.g., network aggregator-based, etc.) can be accommodated.

As depicted, some of the endpoints are associated with data sponsors (i.e., on the left side of the figure) and some of the endpoints are associated with data quota recipients (i.e., on the right side). As those who are skilled in the art will appreciate, after reading this specification, at least some telecommunications endpoints can be involved with both sponsoring data and receiving a data quota. For example and without limitation, a user at endpoint 104-5 can sponsor data through system 202 as depicted, while in a different set of transactions, endpoint 104-5 can receive a data quota through provisioning system 208 as depicted.

Subscribers at some endpoints can have a data quota provided two them via at least two different data products. For example, the subscriber at endpoint 104-3 can have data directly provisioned to the endpoint via provisioning system 206 or provisioned via a zero-rating system associated with provisioning system 208. The actual delivery of data to endpoint 104-3 is through the MNO of CSP network 102-2, in both scenarios.

In addition, a given endpoint can be associated with multiple scenarios of sponsoring data (e.g., application provider-based, rewards portal-based, etc.).

The respective endpoint depictions in FIGS. 1 and 2 are not intended to imply a fixed relationship between the data sponsors and recipients shown in FIG. 2 and the CSP networks shown in FIG. 1. Different relationships are possible in addition to or instead of what is provided herein for illustrative purposes.

As depicted in FIG. 2, the endpoints associated with data sponsors and the endpoints associated with data recipients are different. As those who are skilled in the art will appreciate after reading this specification, however, a given telecommunication endpoint can be associated with both a data sponsor and a data recipient. A user at a given endpoint can use one or more data sponsor mechanisms to top-up the user's own data quota.

In FIG. 2, platform 201 performs at least some of the operations of the illustrative embodiment and, in doing so, coordinates data sponsors and data recipients. Platform 201 is described in more detail below and in regard to FIGS. 3 and 4.

System 202 comprises application server 203 and one or more telecommunication endpoints, including endpoints 104-2 and 104-5. Endpoints 104-2 and 104-5 are capable of executing an over-the-top (OTT) software application, or "app". An OTT app enables the endpoint, and thus its user, to access the corresponding OTT call service provided via server 203. The OTT call service provides a mechanism for the user to sponsor data via the OTT app and on behalf of a data recipient who is specified by the user. Alternatively, endpoints 104-2 and 104-5 are capable of executing an app that is provided by the endpoint user's MNO to coordinate with server 203, thereby enabling the user to sponsor data via the MNO and on behalf of a data recipient who is specified by the user.

System 204 comprises application server 205 and one or more telecommunications endpoints, including endpoints 104-1 and 104-6. Endpoint 104-1 and 104-6 are capable of executing a reward portal app. Such an app enables the endpoint, and thus its user, to access a reward portal via server 205. The reward portal provides a mechanism for the user to sponsor data via the app and on behalf of a data recipient who is specified by the user.

System 206 comprises mobile network operator (MNO) system 207 and one or more telecommunications endpoints, including endpoints 104-3 and 104-4. Each endpoint is capable of interacting with MNO system 207, which provides data to one or more of endpoints 104-3 and 104-4 associated with the MNO, by accepting an instruction or request (e.g., via an application program interface [API] call, etc.) to provision a data quota to the associated endpoint. The quota and consumption against the quote is managed by MNO system 207.

System 208 comprises quota manager (QM) 209 and one or more telecommunications endpoints, including endpoints 104-3, 104-5 and 104-7. QM 209 comprises a mechanism by which to process an instruction or request (e.g., an API call, etc.) to allocate a data quota to the associated endpoint. The quota and consumption against the quota is managed by a sponsored data platform and control app, as part of a zero-rating method as is known in the art. Zero-rating and sponsored data is described in U.S. application Ser. No. 14/628,443, now U.S. Pat. No. 9,582,816, filed on Feb. 23, 2015, which is incorporated by reference herein.

Figure 3:
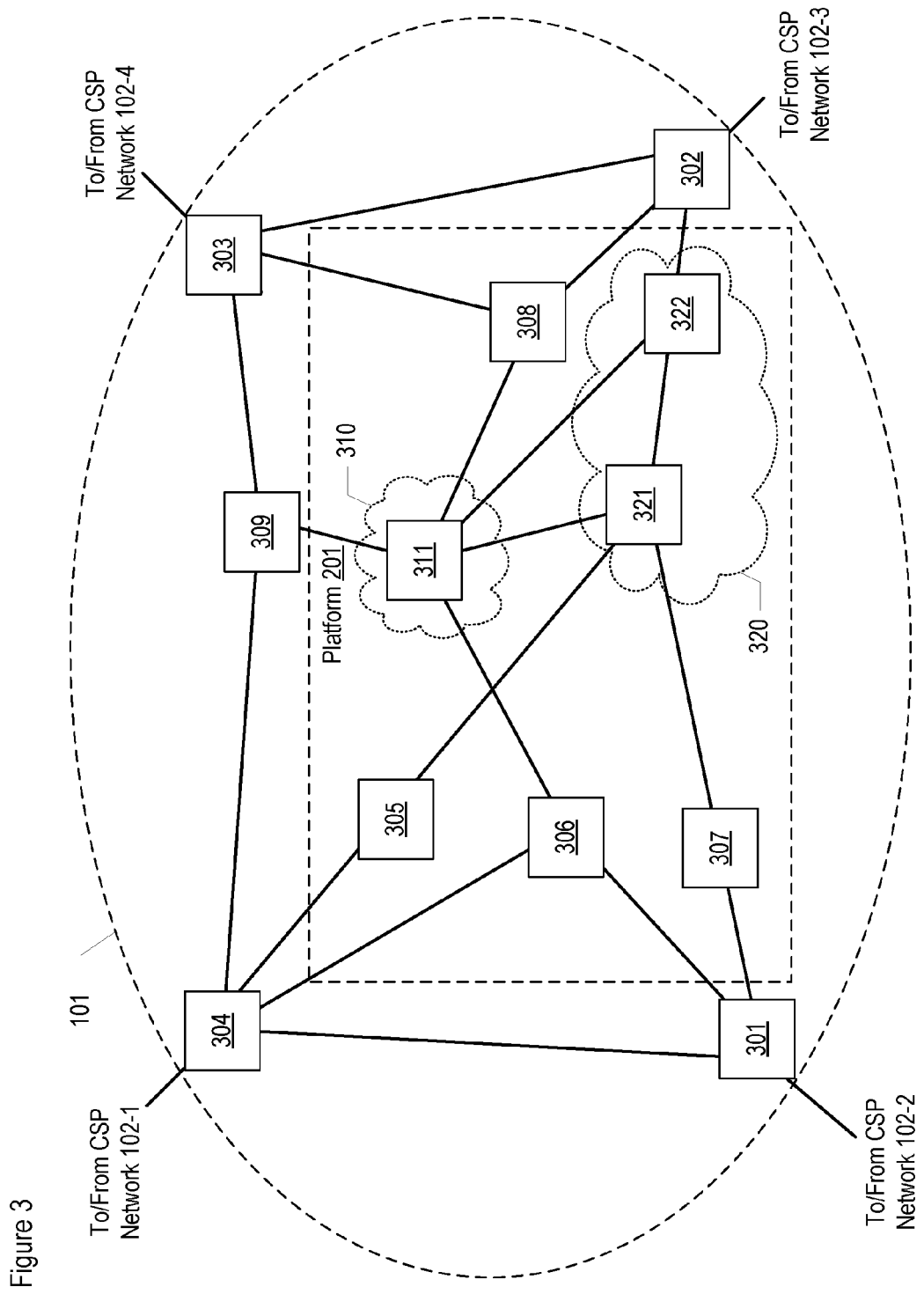
FIG. 3 depicts Internet network 101 within telecommunications system 100.

FIG. 3 depicts Internet network 101 within telecommunications system 100. Internet network 101 comprises routers 301 through 309 and various other computer systems such as, but not limited to, firewalls, load balancers, proxy server computers, application server computers, and database server computers, all of which are known in the art. Some of the aforementioned equipment constitutes platform 201, as described below. Although only some of the aforementioned equipment is depicted in FIG. 3, those with skill in the art will appreciate how to make and use the present invention within the context of an Internet network, after reading this specification.

Platform 201 comprises application proxy server computer 311 within public subnet 310, application server computer 321 and database server computer 322 within private subnet 320, routers 305 through 308, and other computer systems such as firewalls, load balancers, and so on. Application server computer 321 is described below and depicted in FIG. 5. Moreover, application server computer 321 performs at least some of the operations described below and in FIGS. 6 and 7.

As depicted, servers 311, 321, and 322 are represented as being separate and distinct server computers. As those who are skilled in the art will appreciate after reading this specification, however, one or more of servers 311, 321, and 322 can be implemented within a single server computer or within a cloud-based system, or both.

Figure 4:
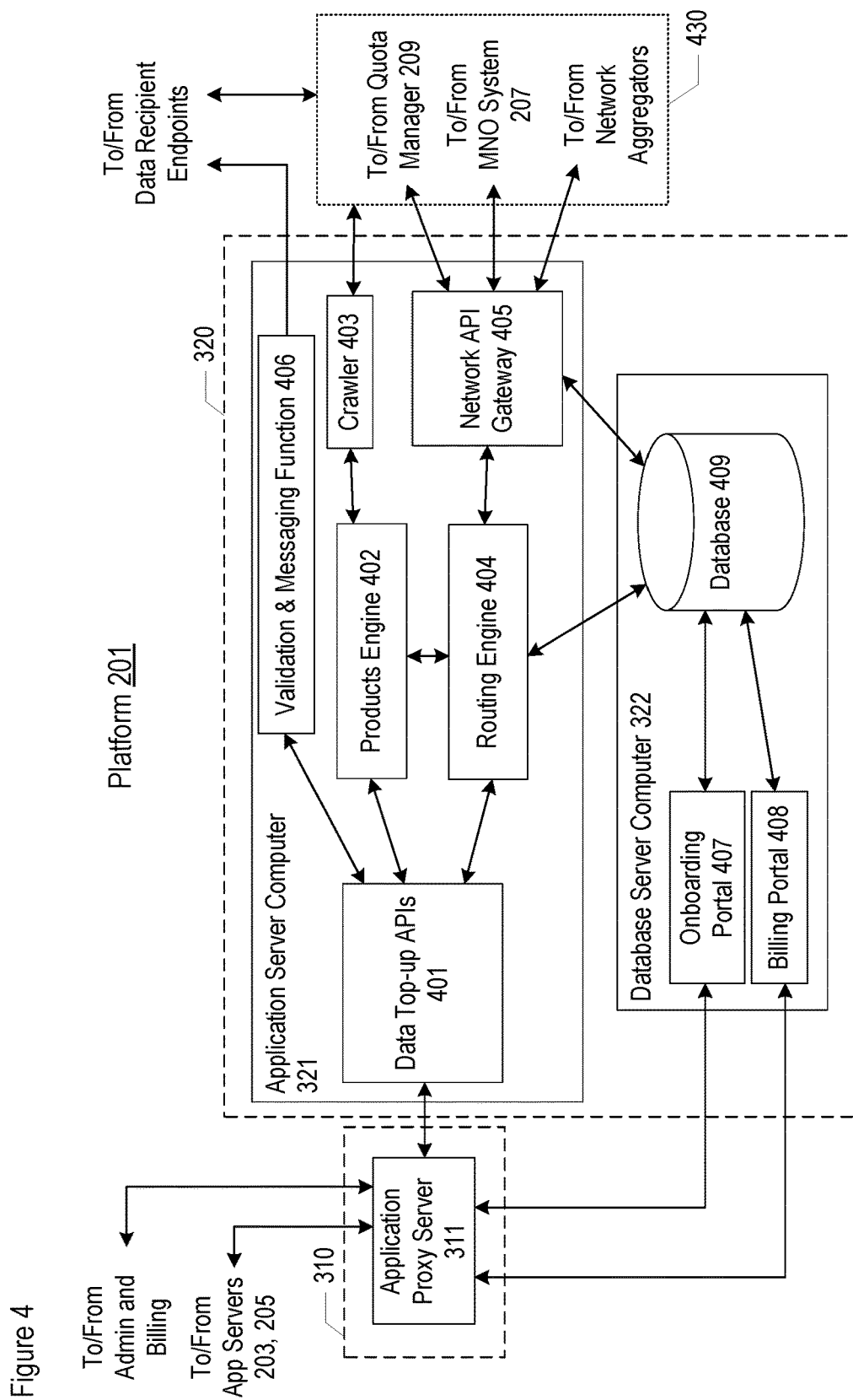
FIG. 4 depicts least some of the functions implemented within platform 201, within Internet network 101.

At least some of the functions implemented within platform 201 (e.g., in software, etc.) are depicted in FIG. 4. As depicted, the functions implemented within application server computer 321 comprise data top-up APIs 401, products engine 402, crawler 403, routing engine 404, and network API gateway 405. The functions implemented within database server computer 322 comprise onboarding portal 407, billing portal 408, and database 409.

Data top-up APIs 401 provide an interface between application servers 203 and 205, via proxy server 311, and one or more of elements 402, 404, and 406. In some embodiments of the present invention, some or all of the APIs used within application server computer 321 are representational state transfer-based (REST-based), as is known in the art.

Products engine 402 stores and indexes available transactions (e.g., those involving a purchase, those involving a transfer, etc.) by network. The products engine is populated with custom products and also dynamically with updates provided by crawler 403. Product information items that can be stored by engine 402 can include, while not being limited to, the following:
   i. product description,
   ii. provisioning mode (i.e., direct network provisioning or zero-rated),
   iii. translation type, including purchase, transfer, and redeem,
   iv. consumption type, including single network, domestic roaming, and international roaming,
   v. price,
   vi. cost,
   vii. performance, including data speed,
   viii. fraud history,
   ix. product package denomination, and
   x. user messages.

Crawler 403 scans networks of providers 430 for offer parameters and updates products engine 402.

Routing engine 404 steers a transaction to the provider meeting business goals, using information stored by products engine 402. Network API gateway 405 normalizes message between routing engine 404 and the providers 430, including MNO 207, QM 209, and one or more network aggregators. A network aggregator reflects a connection and an agreement with multiple MNO networks, in contrast to a single MNO network, to make a connection available to a data quota recipient endpoint. Normalizing through a translator is used in order to account for a lack of a protocol standard and for the multiple provisioning options, including i) MNO 207 billing system and provisioning and ii) the sponsored data control app and back-end processing (i.e., by QM 209).

Routing engine 404 can consider one or more of the following business goals or rules (e.g., operational rules, service guidelines, etc.), for example and without limitation:
   i. margin maximization (price-cost),
   ii. volume goal to provider,
   iii. data-speed maximization, iv. the type of service a customer wants to provide (e.g., a social network, etc.), v. fraud mitigation, and vi. connected device security requirement.

As described below, gateway 405 drives a particular data provisioning option because either that option is the only one available or, if both are available, because the particular option selected meets one or more predetermined business rules (e.g., margin maximized, etc.).

Validation and messaging function 406 verifies the MSISDN of the selected data quota user, as received by APIs 401 from application server 203 or 205. Function 406 also informs the data quota user via one or more messages (e.g., SMS, etc.), of the data quota transaction. The data sponsor is informed via APIs 401.

Within database server computer 322, onboarding portal 407 provides for the onboarding, as is known in the art, of the various data suppliers (i.e., direct or zero-rated) and of the customers of the mobile data top-up service disclosed herein. Billing portal 408 provides for the billing coordination of the mobile data top-up service. These onboarding and billing functions are configurable from an MMP administration and billing system, which is not depicted in FIG. 4.

Database 409 is used to store information obtained by onboarding portal 407 and billing portal 408, which information is used by routing engine 404 and gateway 405.

Figure 5:
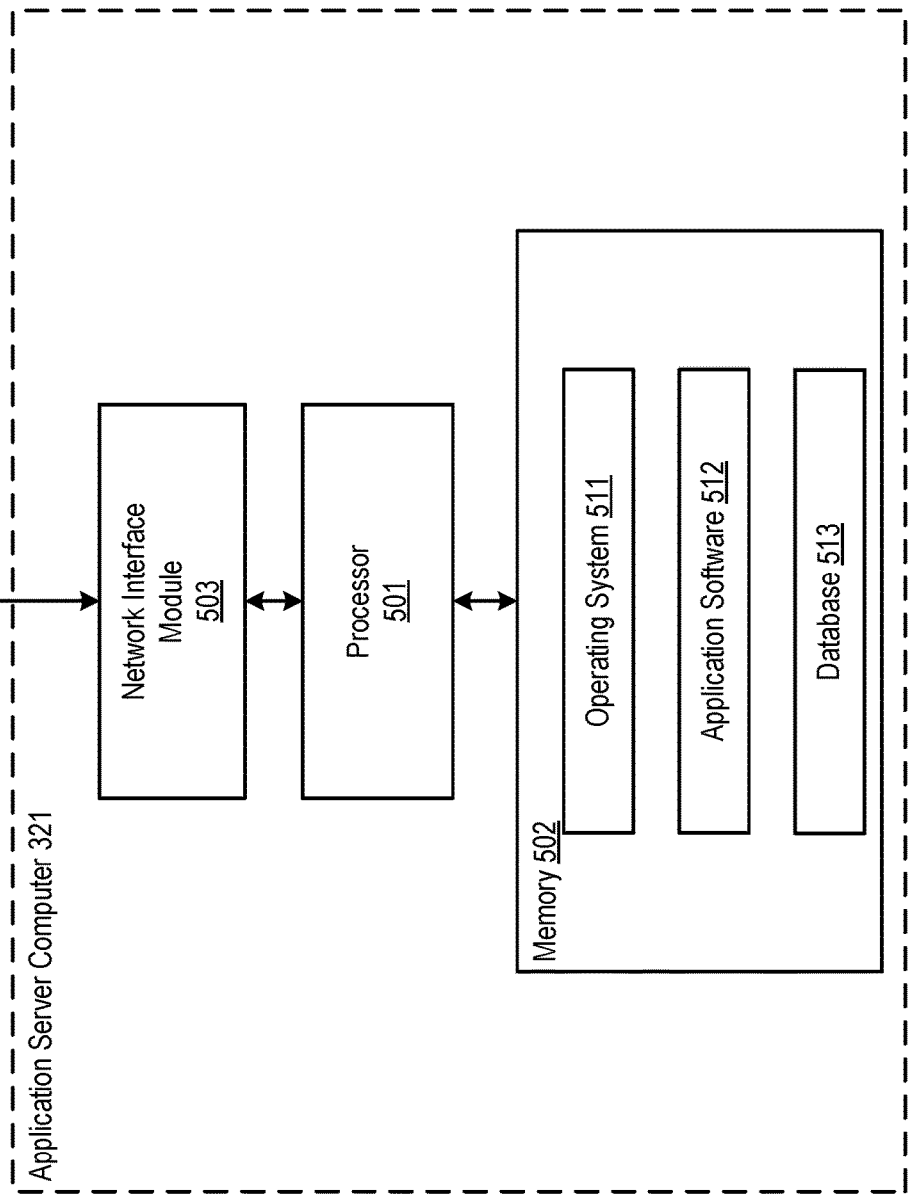
FIG. 5 depicts a block diagram of the salient components of application server computer 321 within platform 201.

FIG. 5 depicts a block diagram of the salient components of application server computer 321 within platform 201, in accordance with the illustrative embodiment. Server computer 321 comprises: processor 501, memory 502, and network interface module 503, which are interconnected as shown.

As those who are skilled in the art will appreciate after reading this specification, the hardware platform performing at least some of the tasks performed by server computer 321 can be embodied as a multi-processor platform, as a sub-component of a larger computing platform, as a virtual computing element, or in some other computing environment—all within the scope of the present invention.

As those who are skilled in the art will appreciate after reading this specification, server computer 321 can be a different type of computer system apparatus than a server computer, and can be referred to by a different name such as a data-processing system, a computing device, or another type of hardware platform that comprises one or more processors, one or more memories, and one or more network interfaces, for example and without limitation.

Processor 501 is a general-purpose processor that is configured to execute operating system 511 and application software 512, and to populate, amend, use, and manage database 513, as described in detail below and in the accompanying figures.

Memory 502 is non-transitory and non-volatile computer storage memory technology that is well known in the art (e.g., flash memory, etc.). Memory 502 is configured to store operating system 511, application software 512, and database 513. The operating system is a collection of software that manages server computer 321's hardware resources and provides common services for computer programs, such as those that constitute the application software. The application software that is executed by processor 501 enables server computer 321 to perform at least some of the functions disclosed herein, and can comprise a products engine, a routing engine, a crawler, and a network API gateway, as described below. Database 513 comprises information received from database server 322.

It will be clear to those having ordinary skill in the art how to make and use alternative embodiments that comprise more than one memory 502; or comprise subdivided segments of memory 502; or comprise a plurality of memory technologies that collectively store the operating system, application software, and database.

Network interface module 503 comprises a network adapter configured to enable server computer 321 to transmit information to and receive information from other parts of platform 201.

In regard to application proxy server computer 311 within public subnet 310 and database server computer 322 within private subnet 320, in some embodiments of the present invention, each of these server computers are similar to application server computer 321 described above and with respect to FIG. 5, at least as far as the equipment itself is concerned. As those who are skilled in the art will appreciate after reading this specification, the hardware platform performing at least some of the tasks performed by one or more of server computers 311 and 322 can be embodied as a multi-processor platform, as a sub-component of a larger computing platform, as a virtual computing element, or in some other computing environment—all within the scope of the present invention.

As those who are skilled in the art will appreciate after reading this specification, any or all of server computers 311 and 322 can be a different type of computer system apparatus than a server computer, and can be referred to by a different name such as a data-processing system, a computing device, or another type of hardware platform that comprises one or more processors, one or more memories, and one or more network interfaces, for example and without limitation.

Figure 6:
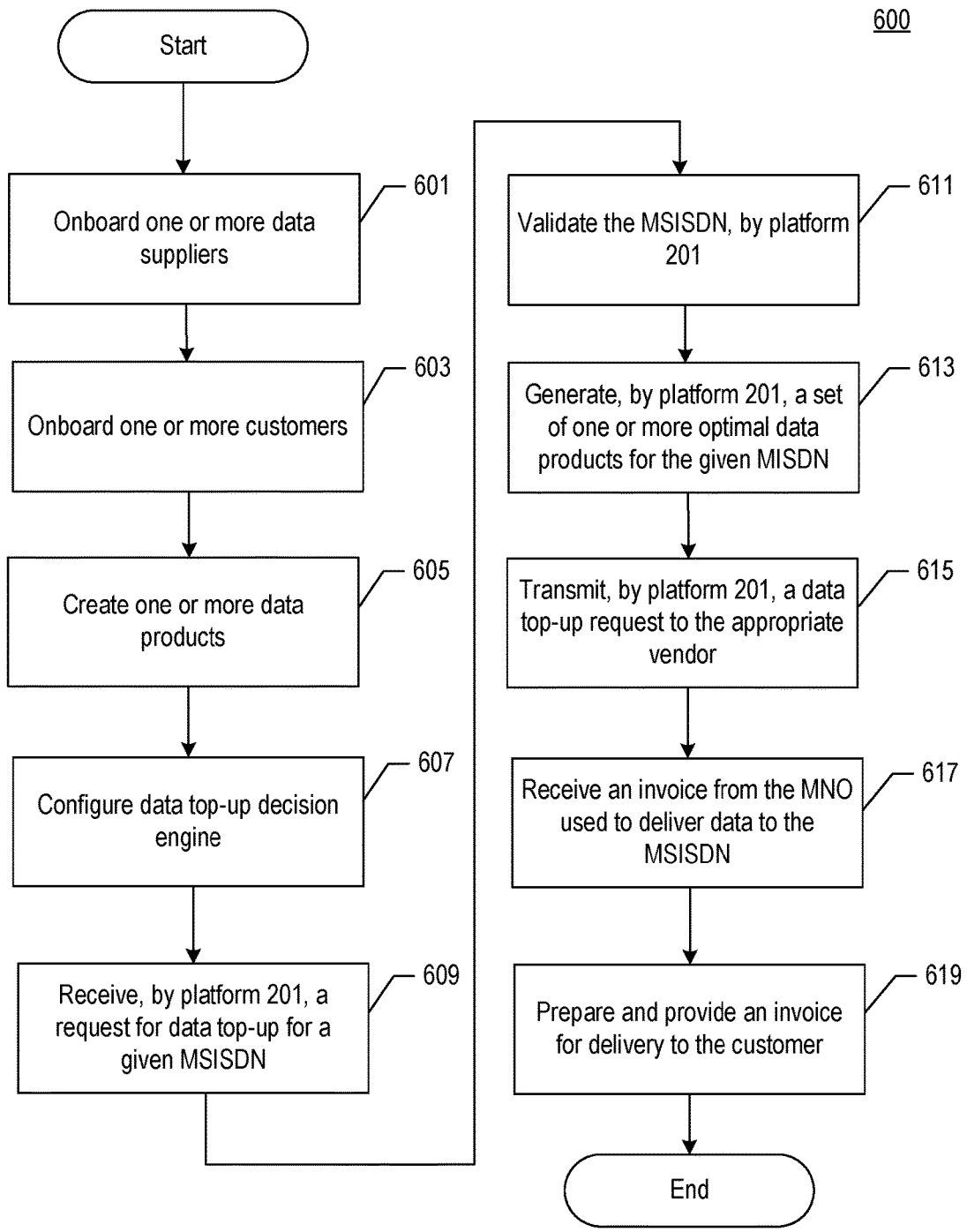
FIG. 6 depict a flowchart diagram that is representative of method 600 as performed by some of the salient components of telecommunications system 100, including platform 201.

FIG. 6 depict a flowchart diagram that is representative of method 600 as performed by some of the salient components of telecommunications system 100, including platform 201 and in accordance with the illustrative embodiment. As depicted in FIG. 6, and also in the message flow diagram of FIG. 7, the processes performed by platform 201 of the illustrative embodiment are depicted in the drawings as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices than depicted. In some embodiments of the present invention, some of the depicted processes might be omitted.

At operation 601, one or more data suppliers are on-boarded. With regard to an MNO, this includes obtaining initial contact information, qualification analysis, service parameters, and a verification of the sponsor list and content with MNO. Once the information is gathered, certain preliminary functions are performed depending on whether there are existing sponsor relationships with the MNO or SDS. These functions include, among any other tasks, whitelisting. With regard to onboarding a sponsored-data system (SDS), the SDS receives at least some of the following information from the sponsor: a) contact list, b) list of MNOs they want or do not want to do business with, c) a description of content type. SDS provides the sponsored data top-level domain (TLD) or Internet protocol (IP) address to the sponsor with a unique identifier that is then pre-pended to the TLD.

At operation 603, one or more customers are on-boarded via an MMP administration and billing system and through onboarding portal 407.

At operation 605, one or more data products are created.

At operation 607, the data top-up decision engine is configured—namely, configuring routing engine 404 and products engine 402, and filling in database 409 with information.

At operation 609, platform 201 receives a request for data top-up for a given, intended data quota recipient endpoint. This is depicted in more detail in FIG. 7, which illustrates an example of endpoint 104-2, which is being served by a first MNO and in CSP network 102-1. Endpoint 104-2 is providing a data quota to endpoint 104-3, which is being served by a second MNO and in CSP network 102-2.

FIG. 7 provides an example of a peer-to-peer data top-up. However, a similar set of message flows and processes are applicable to a reward agent adding to a beneficiary recipient subscriber's data quota (i.e., in return for a particular type of behavior being exhibited by the subscriber), is applicable to a business, other than the MNO that has provisioned the endpoint, selling data that comes as increments to the endpoint's existing quota, and is applicable to other types of data sponsors, for example and without limitation.

As represented by operation 701 in FIG. 7, the subscriber opens the app on endpoint 104-2. The subscriber selects the particular mobile data top-up service to be used and enters the recipient subscriber number, which can be a Mobile Station International Subscriber Directory Number (MSISDN) or other indication of the recipient subscriber at endpoint 104-3. The sponsor subscriber selects the amount of data to be allocated to the recipient subscriber. The subscriber can also select a payment method.

At this point, the app executing at endpoint 104-2 initiates message 703, which includes an indication of the recipient mobile subscriber (i.e., the MSISDN), among other information such as an indication of the amount of data to be allocated. Server 203 forwards the information it receives to proxy server 311, via message 705. Server 311 forwards the information it receives to application server computer 321, via message 707, at which point server computer 321 receives the request for data top-up for the MSISDN indicated, at operation 609 depicted in both FIGS. 6 and 7.

At operation 611, platform 201 validates the MSISDN as being part of, or as being recognized by, a valid on-boarded network (e.g., as a home network, as a roaming network, etc.), in well-known fashion.

At operation 613, platform 201 generates, for the given MSISDN, a set of one or more optimal data products (e.g., generates a set of the best data product or products, etc.) provided by one or more vendors as described below. In the event that more than one data-product option is available for allocating the data quota to the recipient subscriber—as in the case of endpoint 104-3—then platform 201 can select a particular option because that option best meets one or more business goals or rules, as tracked by routing engine 404, while considering one or more product information items, as tracked by products engine 402. Examples of business goals/rules and product information items are described above and with regard to FIG. 4.

Routing engine 404 can select a top-up method when both options are available with a target MNO, according to each possible transaction's residual margin. To this end, and for each transaction being considered, the decision-making engine evaluates both the MNO-based and sponsored data platform-based options, seeking to maximize margin. Margin can be a function of price, agreed-upon sales share % and/or platform cost, with regard to the MNO-based option, and a function of price, wholesale data cost, breakage assumption (i.e., what amount of purchased data ends up not being used), and/or platform cost, with regard to the sponsored data platform-based option.

In some alternative scenarios, maximizing margin of a different entity (e.g., an MNO) than the entity controlling data top-up can be used to determine the top-up option that is to be selected for use. Also, a criterion different than margin can be considered.

As those who are skilled in the art will appreciate after reading this specification, additional vendors can be considered at operation 613 for data provisioning. For example, one or more additional direct providers of a data quota might be considered, depending on what the recipient subscriber is subscribed to, what the capabilities of the direct providers are, and what the product information dictates. Similarly, one or more additional zero-rating systems might be considered. One or more different types of data provisioning systems might be considered, such as network aggregators.

At operation 615, based on the outcome of operation 613, platform 201 transmits a data top-up request to a vendor, including the indications of the recipient mobile subscriber and the amount of data to be allocated. For example, the vendor can be a direct provider of a data quota, as represented by option 720 in FIG. 7, or can be zero-rated, as represented by option 730, wherein the particular option that is selected depends on operation 613.

If a direct provider (e.g., MNO system 207, etc.) of a data quota is to be involved, gateway 405 of server computer 321 transmits message 709 to a first vendor comprising MNO system 207 of data provisioning system 206, thereby provisioning the recipient subscriber (as identified by the MSISDN or other indication) with an additional amount of data (e.g., 500 Mbytes, etc.) based on the indication of the amount of the data amount. At operation 711, MNO 207 informs the recipient subscriber at endpoint 104-3 of the provisioned data, with message 713 (e.g., an SMS message, etc.). The recipient subscriber can be informed of the amount of time that the data allowance will be available to the subscriber, the amount of data in the allowance, and/or the expiration date/time of the allowance. At operation 715, the mobile data account is credited as per the denomination of the data quota. Meanwhile, the MNO of endpoint 104-3 consumes the data that has been provisioned.

If the data is to be zero-rated, gateway 405 of server computer 321 transmits message 721 via quota manager 209 associated with data provisioning system 208, as represented by option 730 in FIG. 7, thereby allocating a data quota (e.g., of 500 Mbytes, etc.) to the recipient subscriber. In other words, message 721 is transmitted to a second vendor, comprising a zero-rating system (e.g., sponsored-data system, etc.). At operation 723, system 208 informs the recipient subscriber at endpoint 104-3 of the data quota, with message 725 (e.g., an SMS message, etc.). The recipient subscriber can be informed of the amount of time that the data allowance will be available to the subscriber, the amount of data in the allowance, and/or the expiration date/time of the allowance. At operation 727, the mobile data account is credited as per the denomination of the data quota. The associated sponsored data system opens, meters, zero-rates, and closes the data connection as per the quota specified.

Now referring back to FIG. 6, at operation 617, invoices from one or more MNOs are received. In some embodiments of the present invention, the sponsored data system, if involved, can monitor the usage of data and assists an MNO to prepare an invoice that the MNO ultimately provides. The MNO can base one or more invoices on negotiated rates and the MNO's byte count (reconciled with the SDS's own byte count), and the SDS can invoice sponsors based on SDS's byte counts at its negotiated rates.

At operation 619, one or more invoices are prepared and provided for delivery to the customer of the mobile data top-up service described herein.

Different variations of data top-up are possible. For example and without limitation, peer-to-peer data top-up can be a two-stage process, as explained here within the context FIG. 7. The app executing at endpoint 104-2 initiates message 703, which includes an indication of the recipient mobile subscriber (i.e., the MSISDN), but with no indication of the amount of data to be allocated. At operation 613, platform 201 generates, for the given MSISDN, a set of one or more optimal data products, similar to what is described above. In response, platform 201 returns the set (e.g., in a list, etc.) of products to the originator, in this case the application running on endpoint 104-2. Then, endpoint 104-2 sends a message to complete the data top-up, which message contains both the indication of the recipient mobile subscriber (i.e., the MSISDN) and the data product to be allocated (i.e., selected from the set provided by platform 201 to the originator). This second message does not have to be subject to operations 609, 611, and 613, and is processed by operations 615 and beyond.

Although a mobile network, mobile subscribers, and mobile data are featured in the illustrative embodiment of the present disclosure, as those who are skilled in the art will appreciate after reading this specification, the teachings in the present disclosure can be applied to a different type of network, subscribers, and/or data, including but not limited to what is disclosed within this specification and its claims.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A computer system for providing mobile data, comprising:
    a database configured to onboard one or more mobile networks to supply data to mobile subscribers at one or more telecommunication endpoints;
    a processor configured to:
        a) validate an indication of a mobile subscriber as being recognized by an on-boarded mobile network, and
        b) generate a set of optimal data products for data top-up from at least two vendors, including at least: i) a first product for data top-up provided by a first vendor comprising the on-boarded mobile network that recognizes the indication of the mobile subscriber; and ii) a second product for data top-up provided by a second vendor comprising a zero-rating system, wherein the zero-rating system is external to the on-boarded mobile network; and
    a network interface configured to:
        a) receive: i) the indication of the mobile subscriber; and ii) an indication of a data amount, and
        b) transmit a data top-up request to a selected vendor, wherein the data top-up request comprises: i) the indication of the mobile subscriber; and ii) the indication of the data amount, and wherein the selected vendor to which the data top-up request is transmitted is based on at least one business rule.

2. The system of claim 1 wherein the selected vendor to which the data top-up request is transmitted is further based on a capability of the on-boarded mobile network.

3. The system of claim 1 wherein the at least one business rule considers margin maximization.

4. The system of claim 1 wherein the at least one business rule considers a type of service that a particular customer wants to provide.

5. The system of claim 4 wherein the type of service includes a social network.

6. The system of claim 1 wherein the at least one business rule considers fraud mitigation.

7. The system of claim 1, where the network interface is further configured to:
    receive a first invoice from the on-boarded mobile network, and
    transmit a second invoice to a first customer, wherein the second invoice is based on the first invoice, and wherein the first customer is other than i) the first vendor, ii) the second vendor, and iii) the mobile subscriber.

8. The system of claim 1, wherein the selected vendor to which the data top-up request is transmitted is the second vendor, and wherein a first telecommunication endpoint associated with the mobile subscriber is operating within the on-boarded mobile network.

9. The system of claim 1 wherein the indication of the mobile subscriber is received from a second telecommunication endpoint.

10. The system claim 1 wherein the indication of the mobile subscriber comprises a Mobile Station International Subscriber Directory Number (MSISDN).

11. A method for providing mobile data comprising:
    onboarding, by a computer system, one or more mobile networks to supply data to mobile subscribers at one or more telecommunication endpoints;
    receiving, by the computer system, i) an indication of a mobile subscriber and ii) an indication of a data amount;
    validating, by the computer system, the indication of the mobile subscriber as being recognized by an on-boarded mobile network;
    generating, by the computer system, a set of optimal data products for data top-up from at least two vendors, including at least: i) a first product for data top-up provided by a first vendor comprising the on-boarded mobile network that recognizes the indication of the mobile subscriber; and ii) a second product for data top-up provided by a second vendor comprising a zero-rating system, wherein the zero-rating system is external to the on-boarded mobile network; and
    transmitting, by the computer system, a data top-up request to a selected vendor, wherein the data top-up request comprises i) the indication of the mobile subscriber and ii) the indication of the data amount, and wherein the selected vendor to which the data top-up request is transmitted is based on at least one business rule.

12. The method of claim 11 wherein the selected vendor to which the data top-up request is transmitted is further based on a capability of the on-boarded mobile network.

13. The method of claim 11 wherein the at least one business rule considers margin maximization.

14. The method of claim 11 wherein the at least one business rule considers a type of service that a particular customer wants to provide.

15. The method of claim 14 wherein the type of service includes a social network.

16. The method of claim 11 wherein the at least one business rule considers fraud mitigation.

17. The method of claim 11 further comprising:
   receiving, by the computer system, a first invoice from the on-boarded mobile network; and
   transmitting a second invoice to a first customer, wherein the second invoice is based on the first invoice, and wherein the first customer is other than i) the first vendor, ii) the second vendor, and iii) the mobile subscriber.

18. The method of claim 11, wherein the selected vendor to which the data top-up request is transmitted is the second vendor, and wherein a first telecommunication endpoint associated with the mobile subscriber is operating within the on-boarded mobile network.

19. The method of claim 11 wherein the indication of the mobile subscriber is received from a second telecommunication endpoint.

20. The method of claim 11 wherein the indication of the mobile subscriber comprises a Mobile Station International Subscriber Directory Number (MSISDN).

21. The method claim 20 wherein the at least one business rule considers connected device security requirements.

* * * * *